United States Patent Office

Re. 28,194
Reissued Oct. 8, 1974

28,194

METHOD FOR PRODUCING FISSURES IN METALLIC SURFACES OF CHROMIUM

Clarence W. Forestek, 8160 Briarwood Drive, Broadview Heights, Ohio 44147

No Drawing. Original No. 3,701,698, dated Oct. 31, 1972, Ser. No. 103,873, Jan. 4, 1971. Application for reissue Oct. 23, 1973, Ser. No. 408,441
Int. Cl. C23g *1/10*
U.S. Cl. 156—18 10 Claims

Matter enclosed in heavy brackets [ ] appears in the original patent but forms no part of this reissue specification; matter printed in italics indicates the additions made by reissue.

ABSTRACT OF THE DISCLOSURE

The process described herein involves a method of producing fissures in a metal surface, such as chromium, by the chemical action of a sulfuric acid bath in which are dissolved a number of metal salts, chromium sulfate, ferrous sulfate and aluminum sulfate, which retard the attack of the acid on the surface so that controlled fissuring is effected to produce the desired size and uniformity of fissures. These fissures are suitable for the interference locking of particles of polytetrafluoroethylene or other friction reducing material.

BACKGROUND OF THE INVENTION

Field of the Invention

This invention relates to a method for non-electrically treating a metal surface to produce uniformly dispersed fissures or interstices. The invention further relates to the creating of uniformly distributed fissures or interstices by a controlled, localized acidic action without electrolysis to obviate the non-uniform results of current density variations. More specifically, the process is still further related to the use of an acidic bath in which the fissuring action of the acid is controlled by the presence of added salts.

Related Prior Art

It is known in the prior art to produce fissures by etching a metal surface with various acid solutions. However such etching processes produce fissures of non-uniform size which are not uniformly distributed over the metal surface. Moreover, such processes are difficult to control and to reproduce.

Furthermore, such methods involve a high rate of metal removal, and result in cracking of the surface in relief of stresses such as in electroplating and create an irregularly contoured surface with local areas of large voids due to non-uniform etching of the metal. Moreover, where the surface is an electroplated surface there is frequently penetration by cracks or pits through the electroplated surface to the base material. These surfaces are porous and weakened structurally by the uncontrolled etching.

It is desirable therefore to develop a method whereby fissures and interstices of uniform size and distribution can be produced in a metal surface without loss of strength and other desirable properties in the metal surface. One particular use for surfaces having uniformly distributed fissures and interstices is for the containment of finely divided particles of metallic and non-metallic materials as taught in U.S. Pats. Nos. 3,279,936 and 3,502,493.

SUMMARY OF THE INVENTION

In accordance with the present invention, it has been found possible to produce a multiplicity of fissures or pores in a metal surface such as chromium, nickel, etc., whether the surface is one electroplated by such metal or is an article consisting completely of that metal, by the action of an acid solution containing metal salts dissolved therein. It appears that the presence of the metal salts produces desirable localized attacks, to produce the fissures or pores instead of a general etching which will be produced by the acidic solution in the absence of the dissolved metal salts. In this way the fissures are uniformly distributed, of a greater number, and of controlled size in contrast to the general etching produced by the acid alone.

In producing fissures or pores in a chromium surface, a sulfuric acid solution of 20–[30] *37* percent by weight, containing 10–16, preferably 12–14 ounces per gallon of chromium sulfate, 0.1–0.6, preferably 0.2–0.4 ounce per gallon of ferrous sulfate and about 0.4–1.2, preferably 0.6–1.0 ounce per gallon of aluminum sulfate, is particularly effective. Preferred concentrations are 22–[26] *36* percent by weight of sulfuric acid solution containing 13 ounces per gallon of chromium sulfate, 0.3 ounce per gallon of ferrous sulfate and 0.8 ounce per gallon of aluminum sulfate. The controlled fissuring is effected by preheating the bath to a temperature of 145–175° F., preferably about 160–170° F. The metal article is preferably preheated to approximately the same temperature as the bath so that immersion of the article will not effect a substantial change in the bath temperature. The residence time of the metal surface in the bath will depend somewhat upon the temperature being used, with shorter periods being used for higher temperatures and longer periods for lower temperatures. Generally a 70 second immersion at a bath temperature of 165° F. is satisfactory. At 175° F., 45 seconds are sufficient. At lower temperatures longer periods are desirable, up to about two minutes. With the preferred temperatures of 160–170° F., periods of 55–85 seconds, preferably 60–80 seconds are suitable.

The percentage of surface area that will be converted to fissures or interstices will vary somewhat according to the bath composition, the bath temperature and the quantities per gallon of metallic compounds added. Generally, however, this percentage will be in the range of 10–50%, with the fissures being of a character that will not substantially detract from the physical and chemical properties of the surfaces being processed.

The width and length of the fissures will vary from less than one micron up to 3–4 microns, with a depth varying from about 3 microns to 15 or more microns.

The invention is illustrated by the following examples. These examples are intended merely for illustrative purposes and are not intended to limit in any way the scope of the invention or the manner in which it may be practiced. Parts and percentages are given by weight, unless specifically indicated otherwise.

EXAMPLE I

A sulfuric acid solution is prepared by mixing 75 parts by volume of water with 25 parts by volume of 96 percent by weight sulfuric acid. This solution is placed in a suitable container provided with controlled heating means. To the solution there are added per gallon of solution 13 ounces of chromium sulfate, 0.3 ounce of ferrous sulfate and 0.8 ounce of aluminum sulfate. The bath is maintained at a temperature of 165° F. An article having a chromium surface, preheated to about 165° F. is immersed in the bath for 70 seconds. After removal and washing of the surface with water, examination of the article shows that the surface is fissured to about 40% of the area, with the fissures having a depth in the range of 0.0003 to 0.0007 inch with about 180,000 fissures per square inch. A photomicrograph shows that the surfaces between the fissures are free of pores that are generally created by an uncontrolled attack of acid without the metallic additives. This is used very satisfactorily in locking in tetrafluoroethylene particles of about 10 micron size by interference fit by heating the surface to 400° F. and chilling the particles to −100° F. before depositing these particles in the fissures and allowing both to come to room temperature in accordance with Example III of U.S. Pat. No. 3,279,936.

EXAMPLE II

The procedure of Example I is repeated except that the temperature used for the bath and preheating of the metal is 145° F. and the article is immersed for one minute and 35 seconds. The size and uniformity of the fissures produced are somewhat similar to those produced in Example I.

EXAMPLE III

The procedure of Example I is repeated using 26% sulfuric acid and adding 15 ounces chromium sulfate, 0.4 ounce ferrous sulfate and 1.0 ounce of aluminum sulfate. The bath is maintained at a temperature of 170° F. for 50 seconds to give satisfactory depth and uniformity of fissures.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for producing fissures of controlled size and uniformity in a chromium surface comprising the steps of (a) immersing the chromium surface in an aqueous solution containing 20–[30] *37* percent by weight of sulfuric acid, and 10–16 ounces of chromium sulfate, 0.1–0.6 ounce of ferrous sulfate and 0.4–1.2 ounce of aluminum sulfate per gallon of solution at a temperature of 145–175° F. for a period of 45–120 seconds, the longer periods being used with lower temperatures and the shorter periods being used with the higher temperatures of said temperature range; and (b) then removing said surface from said solution and removing adhered solution from said surface.

2. The process of Claim 1 in which said temperature is in the range of 160–170° F.

3. The process of Claim 2 in which said period is 55–85 seconds.

4. The process of Claim 1 in which said solution contains 22–[26] *37* percent by weight of sulfuric acid and 12–14 ounces of chromium sulfate, 0.2–0.4 ounce of ferrous sulfate and 0.6–1.0 ounce of aluminum sulfate per gallon of solution.

5. The process of Claim 4 in which said temperature is in the range of 160–170° F.

6. The process of Claim 5 in which said period is 55–85 seconds.

7. The process of Claim 4 in which said solution contains about 13 ounces of chromium sulfate, about 0.3 ounce of ferrous sulfate and about 0.8 ounce of aluminum sulfate per gallon of solution.

8. The process of Claim 7 in which said temperature is about 165° F.

9. The process of Claim 8 in which said period is about 70 seconds.

10. The process of Claim 8 in which the sulfuric acid concentration is about [24] *36* percent by weight.

References Cited

The following references, cited by the Examiner, are of record in the patented file of this patent or the original patent.

UNITED STATES PATENTS

| | | | |
|---|---|---|---|
| 3,316,179 | 4/1967 | Hoonstra et al. | 252—147 |
| 3,492,179 | 1/1970 | Gaze | 156—18 |

WILLIAM A. POWELL, Primary Examiner

U.S. Cl. X.R.

252—79.2, 147